(12) United States Patent
O'Connor

(10) Patent No.: US 6,811,325 B2
(45) Date of Patent: Nov. 2, 2004

(54) COMMUNICATIONS ASSEMBLY DISABLING MECHANISM

(75) Inventor: Gary O'Connor, Bolingbrook, IL (US)

(73) Assignee: Corona Optical Systems, Inc., Lombard, IL (US)

(*) Notice: Subject to any disclaimer, the term of this patent is extended or adjusted under 35 U.S.C. 154(b) by 105 days.

(21) Appl. No.: 10/037,507

(22) Filed: Jan. 4, 2002

(65) Prior Publication Data

US 2002/0181902 A1 Dec. 5, 2002

Related U.S. Application Data

(60) Provisional application No. 60/284,489, filed on Apr. 18, 2001.

(51) Int. Cl.[7] .................................................. G02B 6/36
(52) U.S. Cl. ........................ 385/92; 385/88; 385/70
(58) Field of Search ........................... 385/53, 92, 88, 385/89, 70

(56) References Cited

U.S. PATENT DOCUMENTS

| | | | | |
|---|---|---|---|---|
| 4,589,404 A | * | 5/1986 | Barath et al. | 128/6 |
| 5,113,467 A | * | 5/1992 | Peterson et al. | 385/88 |
| 6,176,718 B1 | * | 1/2001 | Skarie et al. | 439/188 |
| 6,213,650 B1 | | 4/2001 | Moriyama et al. | 385/88 |
| 6,511,231 B2 | * | 1/2003 | Lampert et al. | 385/70 |
| 2003/0103735 A1 | * | 6/2003 | Anderson et al. | 385/91 |

* cited by examiner

Primary Examiner—Ellen E. Kim
Assistant Examiner—Sung Pak
(74) Attorney, Agent, or Firm—Welsh & Katz, Ltd.

(57) ABSTRACT

A method and apparatus are provided for optically interlocking a plug and receptacle combination. The method includes the steps of disposing an optical source and receiver in a sidewall of the receptacle with an axis of transmission from the optical source to the receiver directed into and across a plug space of the receptacle substantially perpendicular to an axis of insertion of the plug and activating the optical interlock when an optical signal from the optical source is detected by the optical receiver.

16 Claims, 4 Drawing Sheets

COMMUNICATIONS ASSEMBLY DISABLING MECHANISM

CROSS REFERENCE TO RELATED APPLICATIONS

This application claims the benefits of U.S. Provisional Application No. 60/284,489, filed Apr. 18, 2001.

FIELD OF THE INVENTION

This invention relates, in general, to the safety promotion of optical devices and, more particularly, to enhanced safety features of parallel data link communications systems.

BACKGROUND

Open Fiber Control (OFC) is an ANSI standard method of interlocking Fiber Optic Communication Transmission (FOCT) devices for the express purpose of protecting people from eye damage caused by excessive exposure to dangerous levels of optical frequency (typically 630 nm to 1570 nm) electromagnetic radiation (EMR). An OFC protocol is beneficial in detecting a data channel not completing a loop of data transmission. Reasons for a loss of data include a break in an optical fiber, a cut fiber, or an unattached fiber. The OFC protocol can ensure a parallel link communications system is eye safe with respect to any one of the problems listed above.

Yet, eye safety may not be as high a concern with certain failure means as compared to others. For example, cut, broken, or unattached optical fibers in a location having no human activity could be a low eye safety risk. Yet, one of the above listed problems occurring in a location of high human activity could decrease eye safety in that location.

In addition, the probability of certain failures near optical interconnections could be greater than in remote locations. For example, human contact with optical components is more likely near an interconnect region than in a remote location (i.e., more likely near the end of an optical fiber rather than the middle). Near interconnected devices and areas of higher human activity, an optical fiber connector or optical fiber holding device could become disconnected or detached. As stated before, an OFC integrated circuit could prevent harmful emission of laser light from a device in the event an accident such as those previously mentioned occurs. Yet, an OFC system could provide more safety features than needed and desired (i.e., protection if a problem occurs with an optical fiber itself, in a remote location). OFC systems can be a costly addition to a communications package, as well as adding size to a package profile of a device. For these reasons, an OFC integrated circuit could be too complicated an approach for desired eye safety protection measures.

In this document is described a novel method of promoting eye safety in the event of an unconnected optical fiber holder or fiber connector. The invention could prevent user eye damage if an optical fiber connecting system were disconnected from the optical interface of a device containing an optical transmitter.

DESCRIPTION OF THE PREFERRED EMBODIMENT OF THE INVENTION

Figure 1:
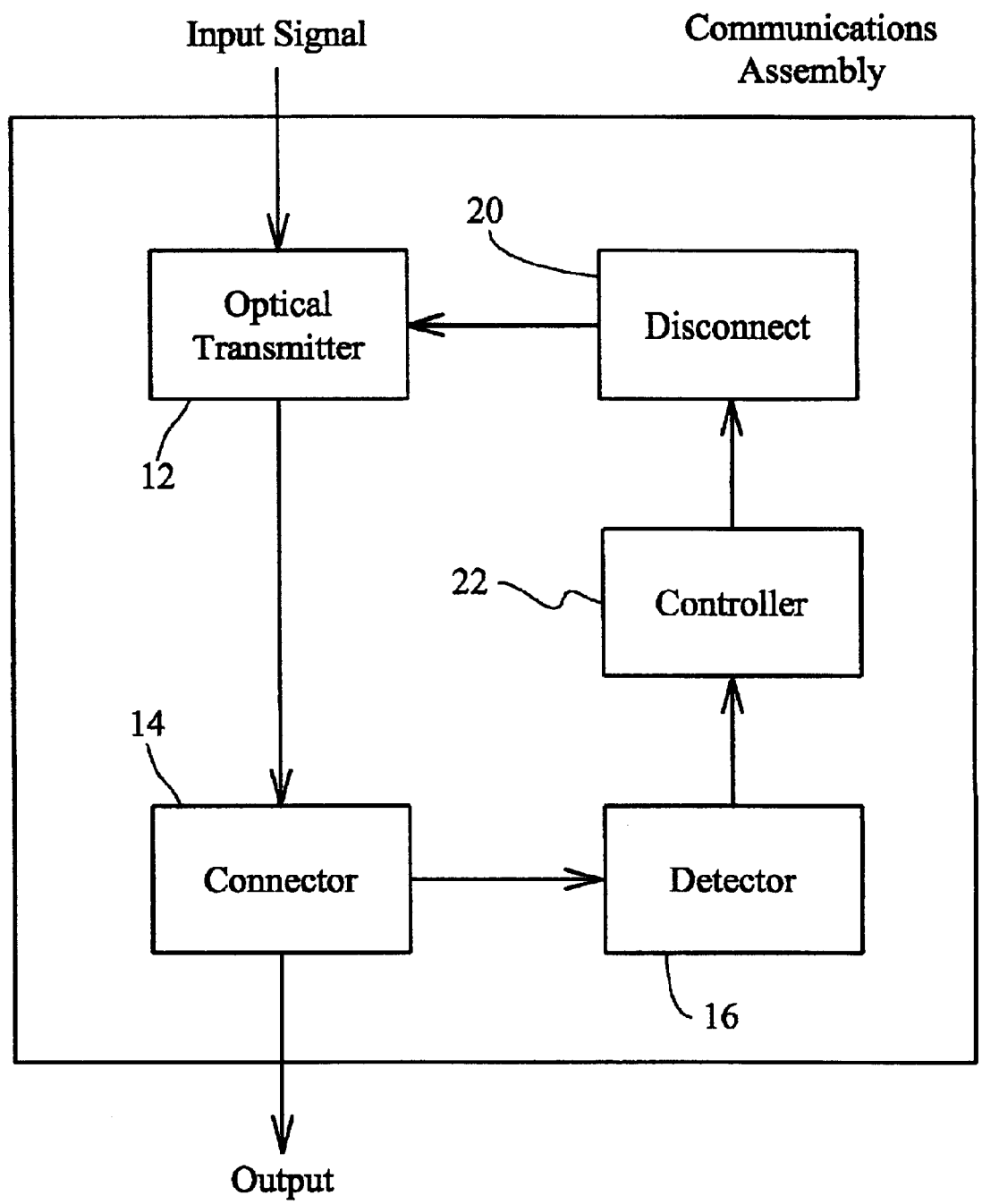
FIG. 1 depicts a optical communication system in accordance with an illustrated embodiment of the invention

FIG. 1 depicts a simplified optical communications converter system 10, shown generally under an illustrated embodiment of the invention. Under the illustrated embodiment, an electrical information signal is provided to the system 10 to be converted to an optical signal output by an optical transmitting device 12. The optical transmitting device 12 may in turn output a signal through an optical connector 14 and further to a remote location (not shown in the figure). In order to promote eye safety in the event of an unconnected optical connector 14, a detector 16 for detecting whether or not the optical connector is correctly positioned to receive optical signals may provide feedback to the system 10. While the detector 16 is shown in FIG. 1 as being separate from the connector 14, it is to be understood that the detector 16 may be disposed within and form a part of the connector 14.

The detector 16 may provide a signal to a controller 18, which in turn may activate or deactivate a system-disabling device, or disconnect 20. The disconnect 20 may prevent or allow the optical transmitting device 12 from transmitting optical signals.

The combination of the controller 18 and disconnect 20 form an optical interlock. When the optical connector 14 is correctly positioned to receive optical signals from the transmitter 12, the optical interlock is disengaged, and the disconnect 20 may allow the optical transmitter 12 to transmit optical signals. When the optical connector 14 is not correctly positioned to receive optical signals from the transmitter 12, the optical interlock is engaged, (i.e., triggered), and the disconnect 20 prevents the optical transmitter 12 from transmitting optical signals.

Figure 2:
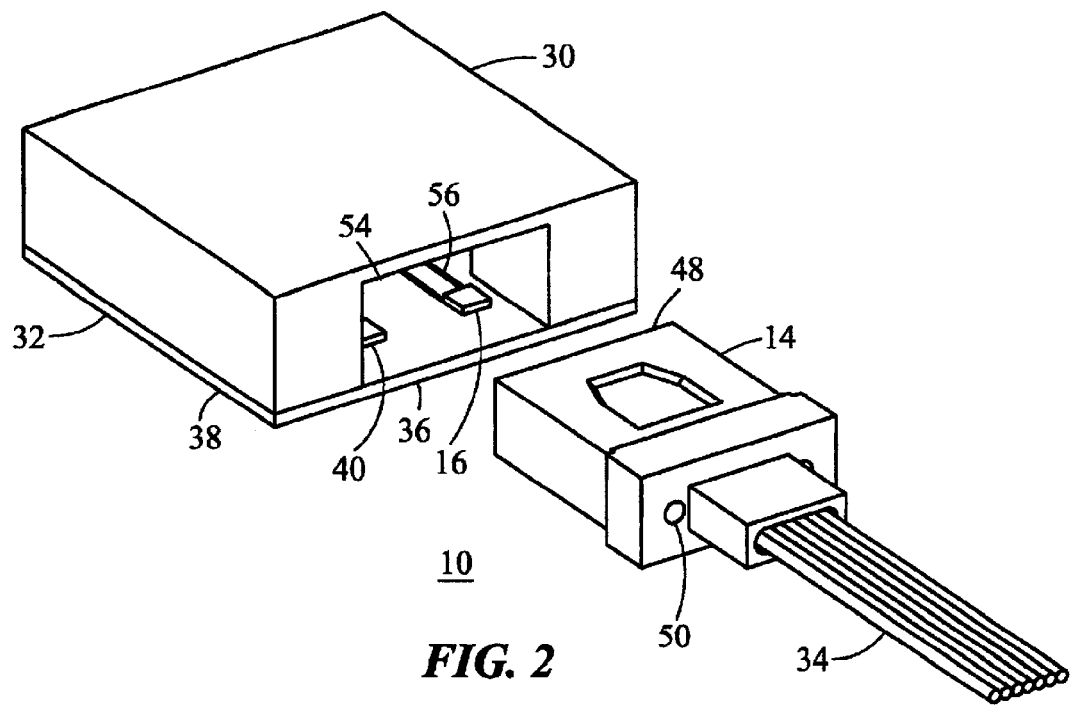
FIG. 2 illustrates a perspective view of an electro-optic communications assembly in accordance with an illustrated embodiment of the invention, in a context of use.

FIG. 2 illustrates a more detailed electro-optic communications assembly 10 in a context of use, according to a preferred embodiment of the invention. The communications assembly 10 may be used as part of an ultra-high speed router used as a hub in a communication system (e.g., Internet, PSTN, etc.). Further, the assembly of FIG. 2 provides an example of a device that may be mounted in a back plane of a rack in a communications cabinet. Under the illustrated embodiment of FIG. 2, the communications assembly may be used in converting electrical signals to/from optical signals. Such signals could be telephone signals, internet protocol traffic, corporate Ethernet traffic, etc. While FIG. 2 will be described as including the entire system 10 of FIG. 1, it is also to be understood that FIG. 2 need only include the connector 14 and detector 16 while the remaining components 12, 20, 22 may be located remotely and activated by a signal from the detector 16.

The communications assembly 10 may include a plurality of optical devices (not shown) contained within a converter housing 30. The converter housing 30 may be used to protect the optical devices and provide structural support for additional devices attached to the assembly 10. The optical devices contained within the housing 30 may include any combination of signal transmitting or receiving devices. The communications assembly 10 may also comprise a printed circuit board, or PCB 32, to which the converter housing 30 may be mechanically attached. As shown in FIG. 2, the housing 30 could be attached to a first surface 36 of the PCB 32 by an appropriate adhesive. Attached to the second surface 38 of the PCB 32 may be a plurality of electrical contacts (not shown) for electrically connecting the communications assembly 10.

The PCB 32 may be any suitable material such as FR4, ceramic interconnect, or the like. The mechanical housing 30 may be an aluminum, aluminum alloy, or similar material having suitable strength and thermal properties for heat removal. The housing 30 could be fabricated by conventional machining or die cast procedures. As shown in FIG. 2, the housing may contain an opening (i.e., receptacle) 54 for receiving the optical connector (i.e., plug) 14.

The communications assembly 10 of FIG. 2 may also comprise a plurality of optical fibers 34 attached to the optical connector 14. In a preferred embodiment of the invention, the fibers 34 form a ribbon cable comprising twelve optical fibers. Yet, the number of optical fibers used in the invention is not limited to a specific number. The optical fibers may transmit optical signals to or from the optical devices (not shown) within the converter housing 30.

In FIG. 2 the optical connector 14 is not attached to the housing 30. However, the optical connector 14 may be inserted into the opening 54 of the housing 30 when optical signals are to be transmitted to or from the communications assembly 10.

Figure 4:
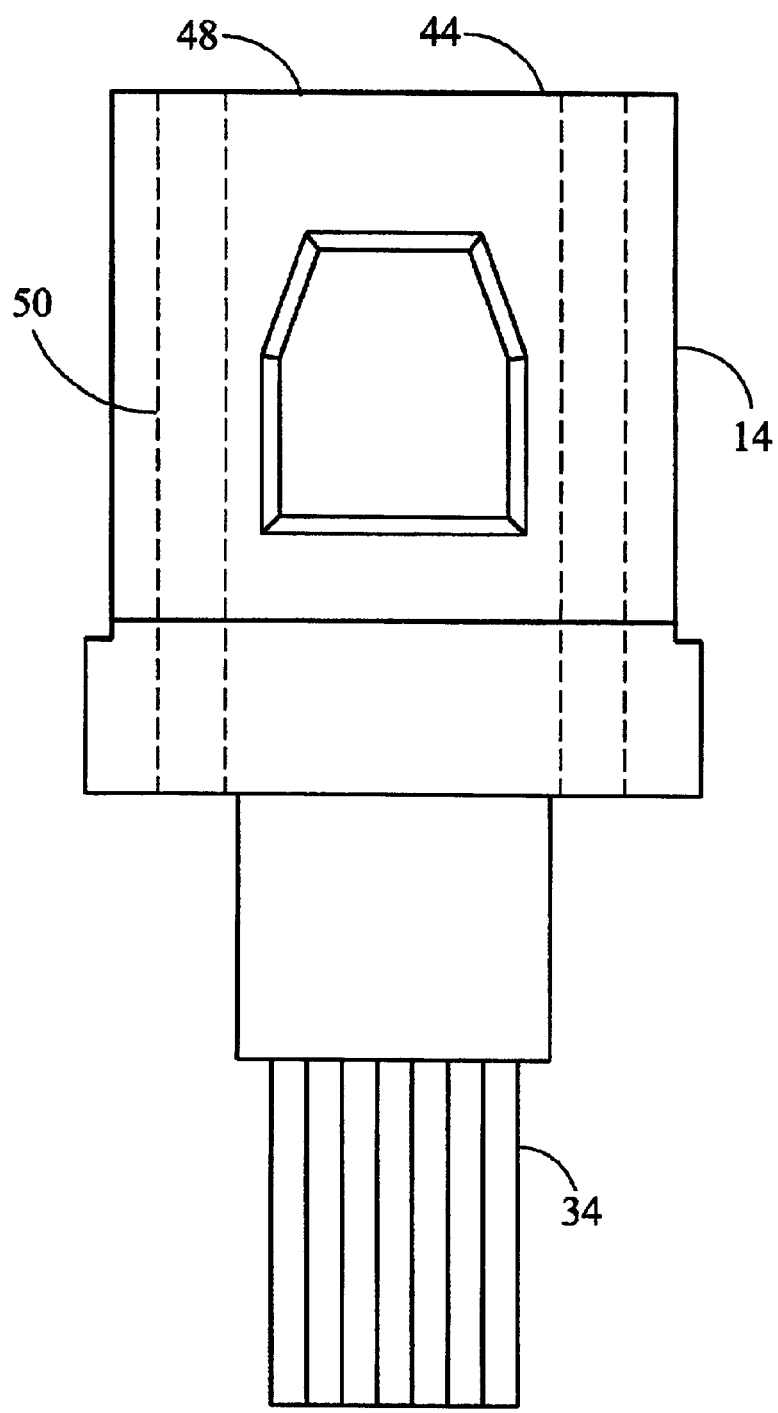
FIG. 4 depicts the optical fiber holder of FIG. 2.

Shown within the optical connector 14 (FIGS. 2 and 4) are alignment apertures 50 that may be used to properly align the optical fibers 34 of the connector 14 to the optical devices contained within the housing 30. The apertures 50 may extend the length of the holder 14 as shown in FIG. 4. The apertures 50 could be used in conjunction with guide pins (not shown), located in the housing 30, that are appropriately positioned relative to the optical devices within the assembly 10. The connector 14 could be inserted into the housing such that the guide pins are concurrently inserted through the apertures 50 on a first/front surface 48 of the connector 14. In a preferred embodiment of the invention, the optical connector 14 could be a standard MT connector manufactured by US Conec or Nippon Telephone & Telegraph (US Conec Part number MTF-12MM7).

Figure 3:
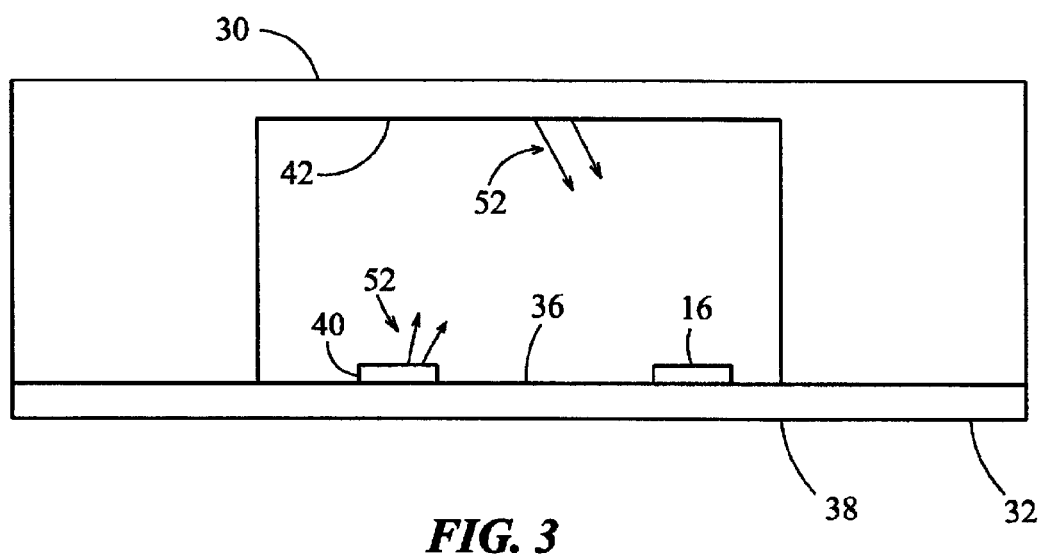
FIG. 3 depicts a front view of the electro-optic converter housing shown in FIG. 2.

FIG. 3 shows a front view of the communications assembly of FIG. 2 when the optical connector 14 is not present, (i.e., when optical fibers and their corresponding connector are not connected to the system). Shown in the figure are an optical source 40, and the detection device, or optical receiver 16. Each device 16, 40 may be attached to the first surface 36 of the PCB 32 by conventional methods, (i.e., solder, wire bonds, stud bumps). The detection device 16 could be any photodiode, i.e., P-I-N diode, PN diode, or the like. Similarly, the optical source 40 could be one of any eye safe light emitting device, such as an LED 40. In a preferred embodiment of the invention, the optical source 40 is an LED and the optical receiver 16 is a photodiode. For clarity, the optical source 40 and optical receiver 16 will henceforth be referred to as the LED and photodiode, respectively. The specification of the LED 40 and photodiode 16 is not limited to specific values, but includes any appropriate LED 40 and photodiode 16 combination. Briefly turning back to FIG. 2, conductive traces 56 may be disposed on the first surface 36 of the PCB 32 to electrically connect the LED 40 to a supply source and the photodiode 16 to the controller 22.

The LED 40 may be attached to the PCB 32 such that a portion of its output 52 is directed towards an inside surface 42 of the converter housing 30 and where a portion of the output 52 may be reflected back towards the first surface 36 of the printed circuit board 32, adjacent the LED 40. In a preferred embodiment of the invention, the LED's output 52 is directed at an inner top surface 42 of the housing 30, and it could operate continuously without modulation. The inner surface 42 could have an added finish to enhance its reflectivity (i.e., a polished or smoothed finish to promote light reflection). The housing 30 or selected surfaces of the housing could have a metallic plating to promote optical reflections. Yet, in a preferred embodiment of the invention, the fabrication techniques may provide the inner surface 42 with adequate reflectivity. The photodiode 16 could be attached to the PCB 32 adjacent the LED 40 such that the photodiode receives a portion of the light output 52 from the LED 40 reflected from the inside top surface 42 of the housing 30. When the optical connector 14 is not present (i.e., not inserted through the opening 54 of the converter housing 30 so as to receive optical signals), as illustrated in FIG. 2, the photodiode 16 detects light 52 reflected off the inside top surface 42 of the converter housing 30. When the photodiode 16 receives light from the LED 40, this activates the optical interlock. As previously mentioned, when the optical interlock in activated, the controller 22 instructs the disconnect 20 to suspend the transmission of optical signals from the transmitter 12. If the optical device in the communications system 10 is a receiving device, the local system could disable a remote system from transmitting optical signals.

Figure 5:
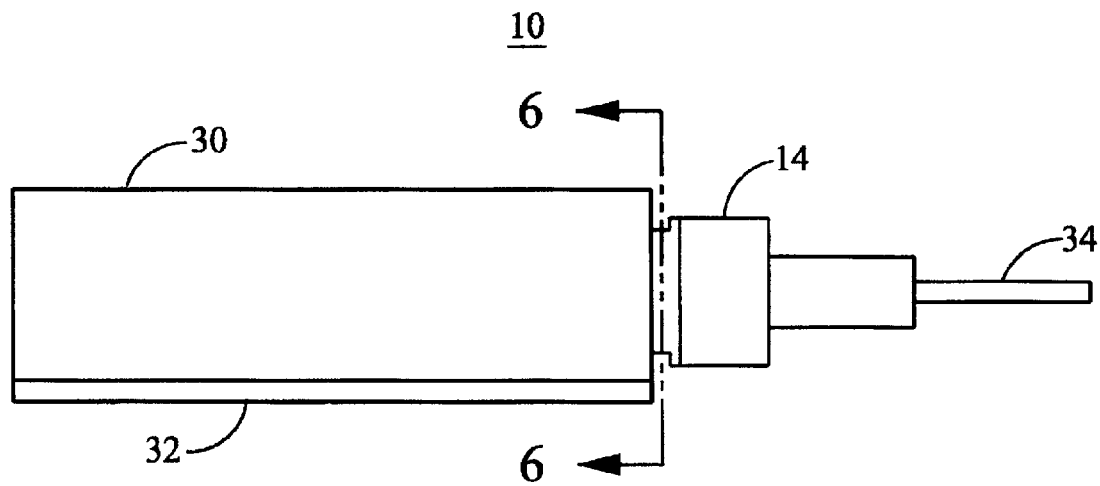
FIG. 5 is a side view of FIG. 2, with the optical fiber holder inserted into the electro-optic converter housing.
Figure 6:
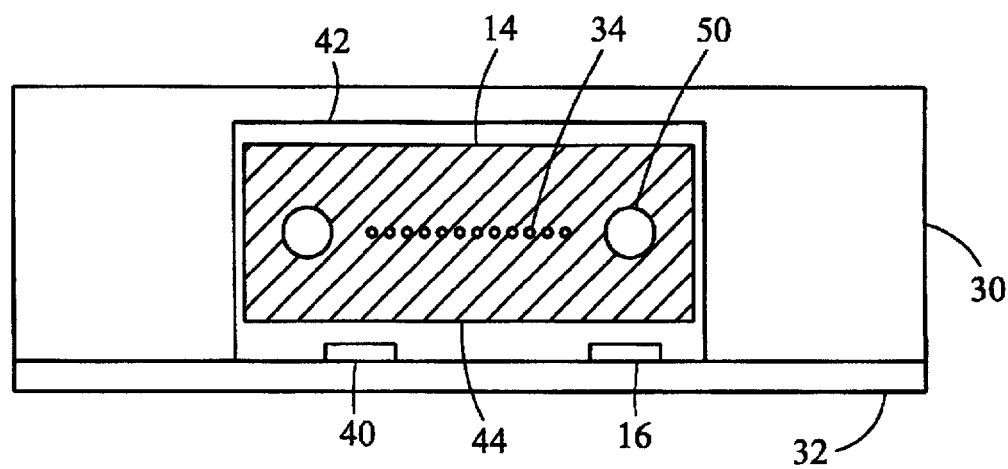
FIG. 6 is a section view of the optical fiber holder of FIG. 5.

FIGS. 5 and 6 illustrate a preferred embodiment of the present invention with the optical connector 14 inserted through the opening 54 of the converter housing 30. In the front section view of FIG. 6, the inserted optical connector 14 is positioned such that its bottom surface 44 prevents the LED's light output 52 from impinging the inner top surface 42 of the housing 30 and being reflected to the photodiode 16. In this situation, the LED output 52 is scattered and absorbed by the optical connector 14, thereby preventing light from striking the photodiode 16. As the photodiode 16 is not receiving a light input, this deactivates the optical interlock, (i.e., the controller 22 instructs the disconnect 20 to allow the optical transmitter 12 to function), thus allowing the optical transmitter 12 to transmit communications signals. Hence, the optical connector 14 is properly inserted into the communications assembly 10, and optical devices within the communications assembly 10 may operate accordingly. Otherwise, when light from the LED 40 strikes the photodetection device 16 in the event of a detached optical connector 14, the disabling of the communications assembly 10 increases the general eye safety of the system and its surroundings.

While a specific embodiment of a method and apparatus for optically interlocking a plug and receptacle combination of a communications assembly has been described for the purpose of illustrating the manner in which the invention is made and used, it should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

Numbering List for 82593, Cable Disconnect and Eye Safety Mechanism

| | |
|---|---|
| 10 | electro-optic communications device |
| 12 | optical transmitting device |
| 14 | optical connector |
| 16 | optical receiver |
| 18 | controller |
| 20 | disconnect |
| 30 | converter housing |
| 32 | PCB |
| 34 | optical fibers |
| 36 | 1st surface of PCB |
| 38 | 2nd surface of PCB |
| 40 | LED |
| 42 | top surface of inside of converter housing |
| 44 | bottom surface of the waveguide connector |
| 48 | 1st surface of waveguide |
| 50 | alignment aperatures in the waveguide |
| 52 | path of light |
| 54 | opening in the converter housing |
| 56 | traces on the printed circuit board |

What is claimed is:

1. A method of optically interlocking a plug and receptacle combination, such method comprising the steps of:

disposing an optical source and receiver in a first sidewall of the receptacle with an axis of transmission from the optical source to the receiver directed into and across a plug space of the receptacle substantially perpendicular to an axis of insertion of the plug so that an optical signal from the optical source is reflected back to the receiver from a second, opposing sidewall; and activating the optical interlock when an optical signal form the optical source is detected by the optical receiver.

2. The method of optically interlocking a plug and receptacle combination as in claim 1 further comprising defining the optical source as a light emitting diode.

3. The method of optically interlocking a plug and receptacle combination as in claim 2 further comprising defining the optical receiver as a photodiode.

4. The method of optically interlocking a plug and receptacle combination as in claim 3 further comprising disposing the receptacle on a printed circuit board wherein the printed circuit board forms a sidewall surface of the receptacle.

5. The method of optically interlocking a plug and receptacle combination as in claim 4 further comprising defining the optical interlock as the combination of a controller and optical transmitter disconnect.

6. The method of optically interlocking a plug and receptacle combination as in claim 5 further comprising defining the plug as an optical connector for holding a plurality of optical fibers and aligning the plurality of optical fibers to an optical transmitter.

7. The method of optically interlocking a plug and receptacle combination as in claim 6 further comprising interrupting the optical signal to the photodiode with the optical connector.

8. The method of optically interlocking a plug and receptacle combination as in claim 7 wherein the step of activating the optical interlock further comprises reflecting the optical signal off a reflective surface of the receptacle and directing the optical signal to the photodiode.

9. An apparatus for optically interlocking a plug and receptacle combination, such apparatus comprising:

the plug and receptacle; and an optical source and receiver disposed in a first sidewall of the receptacle with an axis of transmission from the optical source to the receiver directed into and across a plug space of the receptacle substantially perpendicular to an axis of insertion of the plug so that an optical signal from the optical source is reflected back to the receiver from a second, opposing sidewall in the absence of the plug.

10. The apparatus for optically interlocking a plug and receptacle combination as in claim 9 wherein the optical source is further defined as a light emitting diode.

11. The apparatus for optically interlocking a plug and receptacle combination as in claim 10 wherein the optical receiver is further defined as a photodiode.

12. The apparatus for optically interlocking a plug and receptacle combination as in claim 11 further comprising the receptacle disposed on a printed circuit board wherein the printed circuit board forms a sidewall of the receptacle.

13. The apparatus for optically interlocking a plug and receptacle combination as in claim 12 wherein the optical interlock is further defined as a combination of a controller and optical transmitter disconnect.

14. The apparatus for optically interlocking a plug and receptacle combination as in claim 13 wherein the plug is further defined as an optical connector for holding a plurality of optical fibers.

15. The apparatus for optically interlocking a plug and receptacle combination as in claim 14 wherein the optical connector when inserted in the receptacle interrupts the optical signal to the photodiode.

16. The apparatus for optically interlocking a plug and receptacle combination as in claim 15 further comprising a reflective surface of the receptacle for reflecting and directing the optical signal to the photodiode.

* * * * *